US012779363B1

(12) United States Patent
Patrascu et al.

(10) Patent No.: US 12,779,363 B1
(45) Date of Patent: Nov. 3, 2026

(54) METHODS AND DEVICES FOR THE AUTOMATED COLLECTION OF INTER-LIFT LEACH SOLUTIONS

(71) Applicant: FREEPORT MINERALS CORPORATION, Phoenix, AZ (US)

(72) Inventors: Sergiu Patrascu, Tucson, AZ (US); Vaibhav Srivastava, Tucson, AZ (US)

(73) Assignee: FREEPORT MINERALS CORPORATION, Phoenix, AZ (US)

( * ) Notice: Subject to any disclaimer, the term of this patent is extended or adjusted under 35 U.S.C. 154(b) by 0 days.

(21) Appl. No.: 19/546,163

(22) Filed: Feb. 20, 2026

(51) Int. Cl.
*B01D 11/02* (2006.01)
*C22B 3/02* (2006.01)
*C22B 3/04* (2006.01)

(52) U.S. Cl.
CPC ...... *B01D 11/0207* (2013.01); *B01D 11/0288* (2013.01); *C22B 3/02* (2013.01); *C22B 3/04* (2013.01)

(58) Field of Classification Search
CPC ... B01D 11/0207; B01D 11/0288; C22B 3/02; C22B 3/04
See application file for complete search history.

(56) References Cited

U.S. PATENT DOCUMENTS

| | | | | |
|---|---|---|---|---|
| 4,526,615 | A | 7/1985 | Johnson | |
| 4,958,528 | A | 9/1990 | Garrison | |
| 8,986,423 | B2 * | 3/2015 | Lang | C22B 3/04 75/375 |
| 9,050,545 | B1 * | 6/2015 | Seal | C22B 7/006 |
| 2009/0230207 | A1 * | 9/2009 | Guzman | C22B 3/04 239/266 |
| 2022/0299496 | A1 | 9/2022 | Martinez | |
| 2024/0385085 | A1 * | 11/2024 | Craig | C22B 3/00 |

FOREIGN PATENT DOCUMENTS

| | | |
|---|---|---|
| CA | 2221703 | 5/2007 |
| CN | 101261201 | 8/2010 |
| CN | 207051285 | 2/2018 |
| CN | 207366042 | 5/2018 |
| CN | 110208038 | 9/2019 |
| DE | 9320560 | 11/1994 |
| DE | 102017004167 | 10/2018 |

OTHER PUBLICATIONS

USPTO Non-Final Office Action, for U.S. Appl. No. 18/318,564, dated May 28, 2025.
Response to USPTO Non-Final Office Action, for U.S. Appl. No. 18/318,564, dated Aug. 28, 2025.
USPTO Final Office Action, for U.S. Appl. No. 18/318,564, dated Oct. 2, 2025.
Response to USPTO Final Office Action, for U.S. Appl. No. 18/318,564, dated Dec. 4, 2025.
USPTO Notice of Allowance, for U.S. Appl. No. 18/318,564, dated Feb. 3, 2026.

* cited by examiner

*Primary Examiner* — Adil A. Siddiqui
(74) *Attorney, Agent, or Firm* — Snell & Wilmer L.L.P.

(57) ABSTRACT

Systems, methods, and devices for automated leach solution collection are disclosed. In various embodiments, an automated collection module coupled to subsurface collectors disposed within an ore heap use a controller and pressure control assembly to generate air pressure differentials that displace leach solution into sample vessels for automatic, repeatable leach solution recovery.

26 Claims, 2 Drawing Sheets

METHODS AND DEVICES FOR THE AUTOMATED COLLECTION OF INTER-LIFT LEACH SOLUTIONS

FIELD OF INVENTION

The present invention generally relates to systems, methods, and devices for collecting inter-lift solutions, and more specifically, to systems, methods, and devices for the automated collection of inter-lift solutions from heap leaching operations.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may be inventions.

Heap leaching provides a low-cost method for extracting metal values from relatively low-grade metal-bearing materials and has found particular application in the processing of metal-bearing ores. In heap leaching, the metal-bearing ore is typically placed directly onto an impermeable pad and stacked in one or more layers, known as lifts, to form a heap. An acidic leach solution may then be distributed at an upper surface of the heap and allowed to percolate downward, dissolving metal values for subsequent recovery.

As the acidic leach solution percolates through the heap under the influence of gravity, it may dissolve metal ions from soluble minerals to form a metal-bearing solution. Once the metal-bearing solution reaches the impermeable pad at the bottom of the heap, the solution may be directed into collection drains that discharge the solution into ponds or tanks for further processing, such as by solvent extraction/electrowinning (SX/EW) or direct electrowinning (DEW), to recover the dissolved metal values.

For effective extraction, the heap must remain under leach for an extended period. For example, a single leach cycle may often span several months, if not longer. The metal recovered following an initial leach cycle, commonly referred to as the first-cycle recovery, often represents a majority of the recoverable metal values from a heap. For example, the first-cycle recovery may constitute greater than 80% of the total metal value recoverable from a heap. Optimization of leaching performance therefore requires continuous monitoring and adjustment of multiple variables—including acid concentration, iron concentration, raffinate solution chemistry, pregnant leach solution (PLS) chemistry, permeability, temperature, particle size distribution, and oxygen content—to increase recovery efficiency.

However, ores are heterogeneous blends of minerals that vary widely in their resistance to acid disintegration, rendering accurate metal extraction modelling difficult. For example, some ores contain acid-consuming materials that reduce available acid before it can reach target minerals. In such cases, increased acid application or other leaching parameter adjustments may be required to sustain metal extraction. When such performance deviations are not detected until the leach solution exits the bottom of the heap, valuable time within the leaching cycle is lost, leading to lower recovery and inefficient reagent use.

Accordingly, a need exists for systems and methods capable of automatically sampling and storing leach solution from within an ore heap during operation. Such systems should be compatible with known leach solution collectors suitable for placement within the heap, capable of automatically drawing representative samples from the leach solution collectors, and operable with reduced manual intervention.

SUMMARY

Disclosed herein are systems, methods, and devices for the automated collection of inter-lift leach solutions. Although described herein as systems, methods, and devices for automatically collecting inter-lift leach solutions, the present disclosure is not limited in this regard. For example, the disclosed systems, methods, and devices may be applied to automatically collect solutions from various subterranean environments, including under haul roads, locations adjacent to heap mining operations, or other suitable environments outside of the mining context where automatic sampling of subterranean solutions is desirable.

The term "pressure control assembly," as used herein, should be understood to comprise one or more components, devices, or subsystems operable to selectively add pressure to, reduce pressure within, or otherwise regulate a pressure condition of a fluidly coupled line, conduit, chamber, vessel, or collector. The pressure control assembly may be configured to generate positive pressure, negative pressure (including vacuum pressure conditions), or a pressure differential relative to an ambient environment or another fluid location. For example, the pressure control assembly may comprise at least one of a vacuum pump and an air compressor. In this manner, the pressure control assembly facilitates the controlled movement of a fluid, such as air, leaching solution, pregnant leaching solution, or other process fluid, through or from a subsurface fluid interface including the leach solution collectors disclosed herein.

In an exemplary embodiment of the invention, an automated leach solution collection system may comprise: an ore heap configured to receive a leach solution; a leach solution collector disposed within the ore heap; an automated collection module comprising a pressure control assembly, a controller operatively coupled to the pressure control assembly, and a sample collection vessel; a pressure line fluidly coupling the pressure control assembly to the leach solution collector; and a leach solution sampling line fluidly coupling the leach solution collector to the sample collection vessel; wherein the controller is configured to actuate the pressure control assembly to generate an air pressure differential through the pressure line to induce transfer of leach solution from the leach solution collector through the leach solution sampling line and into the sample collection vessel. In various embodiments, the pressure control assembly may comprise at least one of a vacuum pump and an air compressor.

In various embodiments of the system, the pressure control assembly may comprise an air compressor. In various embodiments, the system may further comprise a plurality of leach solution collectors disposed within the ore heap. In various embodiments, each leach solution collector may be fluidly coupled to the pressure control assembly by a corresponding pressure line, and to a corresponding sample collection vessel by a corresponding leach solution sampling line. In various embodiments, each of the pressure lines and leach solution sampling lines may include at least one valve configured to control a flow of air or leach solution. In various embodiments, the controller may be configured to actuate the pressure control assembly and valves to control sample collection from the plurality of leach solution collectors concurrently, or sequentially. In various embodiments, the valve may be configured to control fluid movement responsive to vacuum pressure generated by a vacuum pump, and/or to control fluid movement responsive to positive pressure generated by an air compressor.

In various embodiments, the ore heap may comprise a run-of-mine ("ROM") ore heap. In various embodiments, the systems, methods, and devices disclosed herein may be suitable for use with a crushed ore heap.

In various embodiments, the pressure control assembly may comprise a vacuum pump and an air compressor. In various embodiments, the leach solution collector may comprise a lysimeter.

In another exemplary embodiment, a method for automated leach solution collection is disclosed, the method comprising: providing an automated leach solution collection system, the system comprising an ore heap, an automated collection module, a leach solution collector disposed within the ore heap, a pressure line fluidly coupling the automated collection module and the leach solution collector, and a leach solution sampling line fluidly coupling the automated collection module and the leach solution collector; actuating, via a controller, a pressure control assembly of the automated collection module to generate an air pressure differential; delivering the air pressure differential through the pressure line to the leach solution collector; transferring leach solution from the leach solution collector through the leach solution sampling line and into a sample collection vessel; terminating operation of the pressure control assembly; and equalizing pressure within the system. In various embodiments, the controller may be configured to actuate the pressure control assembly according to time intervals.

In various embodiments of the method, the pressure control assembly may comprise an air compressor configured to deliver positive air pressure to displace leach solution from the leach solution collector into the sample collection vessel.

In various embodiments, the method may further comprise providing a plurality of leach solution collectors disposed within the ore heap, each fluidly coupled to the automated collection module by a corresponding pair of pressure and leach solution sampling lines. In various embodiments of the method, the controller may be configured to actuate the pressure control assembly and a plurality of associated valves to control sample collection from the plurality of leach solution collectors.

In various embodiments of the method, the controller may be programmed to adjust at least one of a pressure magnitude or a sampling duration based on a location of the leach solution collector, heap permeability, or leach solution viscosity.

In another exemplary embodiment, an automated leach solution collection module is disclosed, the module comprising: a main housing; a pressure control assembly disposed within the main housing and configured to generate an air pressure differential; a controller operatively coupled to the pressure control assembly; at least one sample collection vessel; and a power source operatively coupled to the controller and the pressure control assembly; wherein the module is configured to be fluidly coupled to at least one leach solution collector through a pressure line and a leach solution sampling line.

In various embodiments, the module may be further configured to deliver the air pressure differential to the at least one leach solution collector through the pressure line and to receive leach solution from the collector through the leach solution sampling line into the at least one sample collection vessel.

In various embodiments, the module may be further configured to be fluidly coupled to a plurality of leach solution collectors, each associated with a corresponding leach solution sampling line, pressure line, and sample collection vessel.

In various embodiments, the module may further comprise a support structure coupled to the main housing.

In various embodiments of the module, the power source may comprise at least one battery operatively coupled to a solar panel through a solar charge controller configured to recharge the battery.

BRIEF DESCRIPTION OF THE DRAWING FIGURES

The subject matter of the present invention is particularly pointed out and distinctly claimed in the concluding portion of the specification. A more complete understanding of the present invention, however, may best be obtained by referring to the detailed description and claims when considered in connection with the drawing figures, wherein like numerals denote like elements and wherein:

DETAILED DESCRIPTION OF EXEMPLARY EMBODIMENTS

Figure 1:
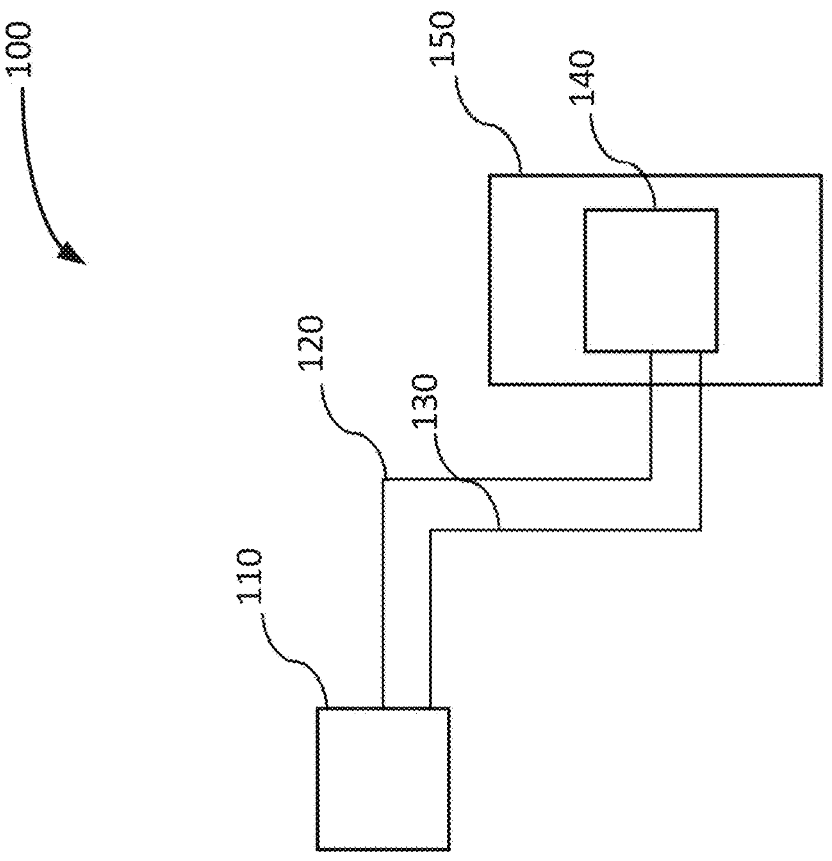
FIG. 1 illustrates an automated leach solution collection system, in accordance with various embodiments.

The following description is merely exemplary in nature and is not intended to limit the present invention, its applications, or its uses. It should be understood that throughout the drawings, corresponding reference numerals indicate like or corresponding parts and features. The description of specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Furthermore, the detailed description of various embodiments herein makes reference to the accompanying drawing figures, which show various embodiments by way of illustration. While the embodiments are described in sufficient detail to enable those skilled in the art to practice the invention, it should be understood that other embodiments may be realized, and that logical and mechanical changes may be made without departing from the spirit and scope of the present invention. Thus, the detailed description herein is presented for purposes of illustration only and not of limitation. For example, steps or functions recited in descriptions of any method, system, or process may be executed in any order and are not limited to the order presented. Moreover, any of the steps or functions thereof may be outsourced to or performed by one or more third parties. Furthermore, any reference to singular includes plural embodiments, and any reference to more than one component may include a singular embodiment.

The present invention generally relates to automated systems, methods, and devices for collecting inter-lift or subsurface leach solutions, and more specifically, to automatic systems, methods, and devices configured for continuous or periodic sampling of leach solutions from heap leach pads and similar environments. The disclosed systems, methods, and devices improve upon conventional heap sampling techniques, which typically rely on manual or semi-manual collection, stationary infrastructure, and/or externally powered equipment. By contrast, the disclosed devices are lightweight, modular, self-contained, and capable of automated operation in off-grid environments using integrated power and control components.

In various embodiments, the methods and devices disclosed herein may be implemented as part of a heap leaching system comprising a heap leach pad formed from a plurality of ore lifts stacked atop one another. One or more leach solution collection devices may be positioned within or beneath one or more lifts, each configured to capture inter-lift or percolated leach solution during operation. These subsurface leach solution collection devices may be installed integrally during heap construction or, in some embodiments, retrofitted into an existing heap by drilling or boring. Placement of these leach solution collection devices may be determined based on geotechnical, hydrological, or operational factors-such as minerology, permeability, acid distribution, or heap stability—to ensure representative sampling. The system may be configured to automatically draw and store representative leach solution samples from the one or more leach solution collection devices, allowing subsequent testing of the collected samples.

In one aspect of the invention, an automated leach solution collection system is provided, the system comprising an ore heap and at least one above-surface collection module operatively coupled to one or more leach solution collection devices disposed within the heap. Each collection device may include a reservoir or chamber for accumulating leach solution. The collection module and each collector may be fluidly coupled by at least two conduits: a pressure line and a leach solution sampling line. The pressure line may be configured to transmit air pressure differentials—including negative pressure via vacuum to induce fluid collection within the collection device, and/or positive pressure via air compressor—between the module and the collector reservoir, while the sampling line delivers leach solution from the reservoir to a sample collection vessel external to the heap.

In various embodiments, the module may comprise a pressure control assembly, such as a combined vacuum/air compressor unit, a vacuum unit, an air compressor unit, or another air pressure source fluidly coupled to the pressure line and configured to generate air pressure differentials resulting in fluid transfer. In various embodiments, the assembly may be automatically actuated on a timed or cyclic basis to produce alternative vacuum and compression intervals.

In certain embodiments, the leach solution collector may comprise a lysimeter having a sampling chamber disposed beneath a semi-permeable interface that allows leach solution to percolate while excluding solids. When a vacuum is applied through the pressure line, leach solution may be drawn into the lysimeter reservoir, where it may then be delivered to a sample collection vessel upon delivery of compressed air.

In alternative embodiments, the leach solution collector may comprise other types of leach solution collection devices, such as those disclosed in U.S. patent application Ser. No. 18/318,564, entitled "Methods and Devices for Collecting Inter-Lift Leach Solutions" (published as U.S. Patent Publication No. 2024/0385085), which include sealed reservoirs configured to accumulate inter-lift solutions. In various such embodiments, the pressure assembly may comprise only a compressor or positive pressure source, without the need for a vacuum component, to deliver controlled pressurization through the pressure line into the sealed reservoir. The applied pressure may displace accumulated leach solution upward through the sampling line and into the surface-level sample bottle. The compressor may be cycled periodically, or actuated on demand to achieve desired sample retrieval.

In typical heap-leach operations, solution conditions vary across the heap due to non-uniform flow distribution, permeability differences, particle size variations, and thermal or chemical gradients. Conventional methods cannot identify these variances until the leach solution reaches the base of the heap, often after several hundred days.

The systems and methods disclosed herein are automated and scalable, enabling remote collection of representative leach solution samples during ongoing heap operations. By collecting inter-lift samples in real time and before the leach solution reaches downstream processing—such as solvent extraction/electrowinning (SX/EW) and/or direct electrowinning (DEW)—the invention allows operators to evaluate solution chemistry, including parameters such as metal value concentration, acid strength, reagent concentration, pH, microbial activity, and redox conditions. Deviations from target parameters may therefore be detected during an ongoing leach cycle, allowing prompt adjustment of leach conditions and improving overall metal recovery efficiency during the leach cycle.

Accordingly, the present invention provides an improved, automatic, and off-grid-capable system for leach solution collection that integrates lightweight construction, automated control, and integrated power. The system may be deployed at multiple sites across a heap, scaled to various sampling locations, and adapted to a variety of leach solution collection devices and operational environments.

Referring now to FIG. 1, an automated leach solution collection system 100 is illustrated, in accordance with various embodiments. The system 100 generally comprises an automated collection module 110 positioned on the surface of, or proximate to an ore heap 150, wherein the module 110 is operatively coupled to at least one leach solution collector 140 disposed within the ore heap 150. The module 110 is configured to generate, regulate, and control air pressure differentials used to facilitate retrieval of leach solutions from the leach solution collectors 140 disposed within the heap. The module 110 is operatively coupled to the leach solution collector 140 through a pressure line 120 and a leach solution sampling line 130. During operation, the pressure line 120 is configured to transmit either a negative or positive air pressure to the collector 140, while the leach solution sampling line 130 is configured to deliver leach solution from the collector 140 to a sample collection vessel, such as a sample bottle.

In various embodiments, the automated leach solution collection module 110 may house one or more components for pressure generation and control, including, for example, a pressure control assembly, which may include a vacuum assembly, a controller, a power source, and at least one sample collection vessel. The module 110 may be self-contained, portable, and configured for automatic operation in off-grid environments, allowing periodic or continuous sample collection without manual intervention.

In various embodiments, the automated collection module 110 may comprise a support structure configured to position a main housing at a desired height relative to a ground surface, pad surface, or mounting substrate. In various embodiments, the support structure may comprise a frame, tripod, skid, or bracket, and may be formed from steel, aluminum, composite, polymeric members, or other materials suitable to withstand environmental conditions inherent to field use during mining operations. In various embodiments, the support structure may further comprise leveling feet, anchors, ground stakes, or other components configured to facilitate transport and/or placement of the module 110.

In various embodiments, the main housing may be supported by the support structure and may define an enclosure that protects internal components from dust, precipitation, solar radiation, and/or impact. The main housing may comprise polycarbonate, aluminum, stainless steel, or other materials with solar radiation and weather-resistant properties. In various embodiments, the main housing may comprise an access door configured to enable access to various components disposed within the enclosure of the main housing.

In various embodiments, the main housing may further comprise a back panel. The back panel may be mechanically coupled to, or formed integral with, the main housing and may be configured to receive and support fluidic and electrical components. The back panel may comprise aluminum and may be configured to operate not only as a structural mounting surface, but also as a thermal heat sink and/or grounding plane.

In various embodiments, the module 110 may further comprise one or more batteries, which may be disposed within one or more battery boxes. The one or more battery boxes may be mounted within the main housing, on the exterior of the main housing, on the support structure, or in an area proximate to the main housing. In various embodiments, the battery boxes may be insulated, vented, heated, or sealed, depending on environmental conditions.

In various embodiments, the module 110 may further comprise one or more solar panels, which may be mounted on the exterior of the main housing, on the support structure, or in an area proximate to the main housing. In certain embodiments, the solar panel may be mounted to a solar mount configured to receive the solar panel, the solar mount being orientable and disposed atop, laterally adjacent to, or in an area proximate the main housing to optimize exposure to solar radiation. In various embodiments, the solar panel may be electrically coupled to the battery through a solar charge controller to maintain energy levels during operation.

In various embodiments, the module 110 may be powered directly from an external electrical power source. By way of non-limiting example, the module 110 may receive power from an electrical supply, such as a 120-volt alternating current source, which may be converted to a lower-voltage direct current, such as a 24-volt direct current, suitable for operation of the module 110.

In various embodiments, the module 110 may further comprise a lightning protection assembly comprising a grounding cable and lightning rod electrically coupled to a conductive member of the main housing, such as, for example, the back panel, and terminated to a driven ground rod or grid proximate the main housing to provide surge protection for the electrical components of the module 110.

With continued reference to FIG. 1, the main housing of the module 110 may comprise one or more fluid inlets and fluid outlets configured to interface with corresponding conduits of the pressure line 120 and the leach solution sampling line 130. A first end of these lines may be removably or permanently coupled to the housing of the module 110 through sealed bulkhead fittings, or may proceed through the main housing and into the enclosure. In various embodiments, the pressure line 120 and sampling line 130 may comprise flexible polymer tubes, composite tubes, or rigid metal conduits, each formed from materials compatible with acidic leach solutions typically utilized in heap-leaching environments.

The pressure line 120 may be fluidly coupled to one or more components within the module 110 configured to generate or regulate air pressure differentials, collectively referred to herein as a pressure control assembly. The pressure control assembly may comprise a reversible pump, dual-diaphragm vacuum and compressor units, air compressor, or other devices capable of applying vacuum or positive pressure through the pressure line 120.

In various embodiments, the pressure control assembly may comprise an air compressor configured to deliver positive air pressure through the pressure line 120 and into the leach solution collector 140. The compressor may include a motor-driven pump and one or more valves, such as solenoid valves, to control the magnitude and duration of air pressure delivery. In various embodiments, the one or more valves, which may be disposed along or otherwise fluidly coupled to the pressure line 120, may be actuated to selectively direct pressure into the collector 140, while simultaneously opening a corresponding outlet valve fluidly coupled to the leach solution sampling line 130 to allow displacement of leach solution into the associated sample collection vessel. The compressor may be coupled to a pressure sensor or pressure gauge. Various such embodiments may be particularly well suited for use with sealed or reservoir-type leach solution collectors in which accumulated leach solution is displaced through the sampling line 130 by controlled pressurization of the leach solution collector 140, such as those disclosed in U.S. patent application Ser. No. 18/318,564 (hereafter, the "'564 Application"), entitled "Methods and Devices for Collecting Inter-Lift Leach Solution" (published as U.S. Patent Publication No. 2024/0385085).

The '564 Application discloses methods and devices for collecting inter-lift leach solution by utilizing a sampling device disposed beneath at least one lift in a plurality of lifts of an ore heap, wherein the sampling device may comprise: a collector for collecting inter-lift leach solution; a reservoir for storing said leach solution; a valve disposed between the storage reservoir and collector; an air pressure line having a first end and a second end, wherein the second end is disposed within the storage reservoir, and wherein the first end is disposed outside of the device; and a solution sampling line having a first end and a second end, wherein the second end is disposed within the storage reservoir, and wherein the first end is disposed outside of the device. The system 100 may automate and render continuous the otherwise manual, discrete leach solution collection method disclosed and enabled by the '564 Application.

In alternative embodiments, the pressure control assembly may comprise a dual-mode unit capable of generating both vacuum and positive pressure, or discrete components including a vacuum pump and an air compressor, each configured to be independently actuated. Various alternative embodiments may be particularly suitable for use with lysimeter-type collectors or other sampling devices amenable for vacuum-induced flow through a porous interface. In various alternative embodiments, a timer relay or reversing relay may be energized to place the assembly in vacuum mode, drawing a negative pressure through the pressure line 120 to induce percolation of leach solution into the lysimeter chamber. After completion of the vacuum interval, the relay may be actuated to switch the mode to deliver compressed air, whereby a valve in the sampling line 130 may open, releasing pressure and transporting leach solution into the sample collection vessel.

In various embodiments, the timer relay may be programmable for variable cycles, such as a 12-hour vacuum interval to draw leach solution into the leach solution collector 140, followed by a 10-20-minute compressed air delivery interval to deliver the collected leach solution to the module 110, although the present disclosure is not limited in this regard and various alternative intervals may be realized by routine experimentation. In various alternative embodiments, a separator or safety canister may be disposed upstream of the pump inlet to prevent leach solution or solid particles from entering the pressure control assembly. The safety cannister may be particularly suitable for embodiments of the invention comprising a vacuum, where during a vacuum interval, the negative pressure differential generated would illicit fluid movement toward the module 110. The vacuum and air compressor may further be fluidly coupled to the pressure line 120 through one or more valves to allow independent or combined operation.

The leach solution sampling line 130 may be fluidly coupled at its first end within the module 110 to one or more sample collection vessels configured to receive and retain leach solution samples withdrawn from the leach solution collector 140. Each vessel may be positioned within or adjacent to the main housing and may include an overflow line to prevent overfilling of the sample collection vessel. In some embodiments, the overflow lines may discharge into a return manifold that routes the solution to a waste or return line leading outside the main housing. In other embodiments, the overflow lines may terminate individually, for example to a designated drain port or to a waste container located within or adjacent to the main housing.

In various embodiments, each sample collection vessel may comprise glass, polycarbonate, high-density polyethylene, or any other material suitable to retain the acidic leach solution sample. In various embodiments, the volume of each sample collection vessel may range from between 100 mL to 1000 mL; however, the present disclosure is not limited in this regard, and sample collection vessels with varying volume capacities may be utilized.

The second end of the pressure line 120 and the leach solution sampling line 130 may each be fluidly coupled to a leach solution reservoir of the leach solution collector 140. The pressure line 120 may be coupled to a pressure port of the reservoir configured to receive a pressure differential from the pressure control assembly, and the sampling line 130 may be coupled to a liquid outlet of the reservoir for withdrawal of leach solution.

In various embodiments, the pressure line 120 and leach solution sampling line 130 are coupled to the leach solution collector 140 during construction of the heap, with their uncoupled ends disposed in an area accessible for future sampling by the methods, devices, and systems disclosed herein, such as in an area adjacent to the heap. In alternative embodiments, the pressure line 120 and leach solution sampling line 130 may be coupled to the leach solution collector 140 following construction of the heap, which may require the leach solution collector 140 to be placed at a subsurface level within the heap by drilling or boring.

During operation, a controller housed within the module 110 may actuate the pressure control assembly to create a pressure differential along the pressure line 120, thereby inducing transfer of leach solution from the leach solution collector 140 through the sampling line 130 and into the sample collection vessel. After a programmed interval, the controller may deactivate the pressure control assembly and isolate the sample vessel for further flow. The system 100 may then automatically repeat the cycle according to stored timing logic to provide periodic or continuous collection of leach solution samples.

In various embodiments, the controller housed within the module 110 governs operation of the system 100. The controller may comprise one or more programmable logic devices, timers, or microcontrollers and may be configured to actuate the pressure control assembly and control open and closed valve states. In various embodiments, the controller may store parameters-which may include pressure setpoints, timing intervals, and sequencing rules- and may execute stored routines for calibration and/or operation to match site-specific hydraulic conditions, line length, elevation, or leach fluid viscosity variations. In various embodiments, the controller may further comprise a manual override mechanism or protocol that permits an operator to initiate a manual vacuum or compression cycle for testing, calibration, or emergency operation.

In various embodiments, the module 110 may further comprise an integrated electrical system configured to route power to the various components stored within the main housing of the module 110. In various embodiments, power for the electrical system may be supplied by at least one battery, which may be disposed within a sealed battery box mounted internally or externally to the housing, or otherwise disposed proximate the housing. The battery may be electrically coupled to a solar charge controller, which may regulate charging current received from a solar panel mounted on or adjacent the main housing or support structure. The solar charge controller may be configured to prevent over-discharge of the battery. Thus, the module 110 may be configured to operate in off-grid installations with minimal maintenance or power supply infrastructure.

The module 110 may be configured to operate effectively across a wide range of environmental and hydraulic conditions, allowing deployment in both surface and subsurface sampling applications. In various embodiments, the pressure control assembly is capable of generating sufficient suction and discharge pressure to achieve a vertical sample draw of greater than 100 feet, such as, for example, up to 400 feet. In various embodiments, the pressure control assembly is capable of generating sufficient suction and discharge pressure to achieve a horizontal draw of greater than 1000 feet, for example, up to at least 2000 feet; however, the present disclosure is not limited in this regard, and greater horizontal draw displacement may be achieved using the systems and methods disclosed herein. The module 110 is thus configured to enable consistent fluid retrieval from deep or highly resistive media, including course ROM ore heaps, crushed ore lifts, and tailings impoundments.

In various embodiments, the system 100 may comprise a plurality of leach solution collectors 140 disposed within the ore heap 150. In certain embodiments, for example, the system 100 may comprise two, three, four, or more collectors 140, each coupled to its own pressure line 120 and leach solution sampling line 130 fluidly coupled to the automated collection module 110. The system 100 may comprise a plurality of sample collection vessels corresponding to each of the plurality of collectors 140, the sample collection vessels disposed within or proximate the module 110 such that samples from various discrete locations in the ore heap 150 can be individually analyzed. The pressure control assembly and valves within the module 110 may be configured to apply a pressure differential to one or more collectors 140 as required, with control logic capable of adjusting timing, magnitude, and duration of the pressure differential based on operational parameters unique to each collector 140.

In various embodiments, the module 110 may be compatible with both lysimeter-type and reservoir-type leach solution collectors 140, such that the plurality of leach solution collectors 140 may comprise at least one of each type of leach solution collector 140.

In various embodiments, the controller may be preprogrammed or user-adjusted to actuate the pressure control assembly and associated valves to draw or discharge leach solution from each collector 140 either sequentially or simultaneously. The controller may be configured to regulate the pressure delivered to each collector 140 according to factors such as collector depth, solution viscosity, or heap permeability to ensure uniform sampling conditions.

In various embodiments, the system 100 may comprise multiple automated collection modules 110, each configured to collect samples from one or more associated leach solution collectors 140. The modules may operate independently or in coordination through synchronized programming, allowing sampling across large or multi-lift heap installations.

Figure 2:
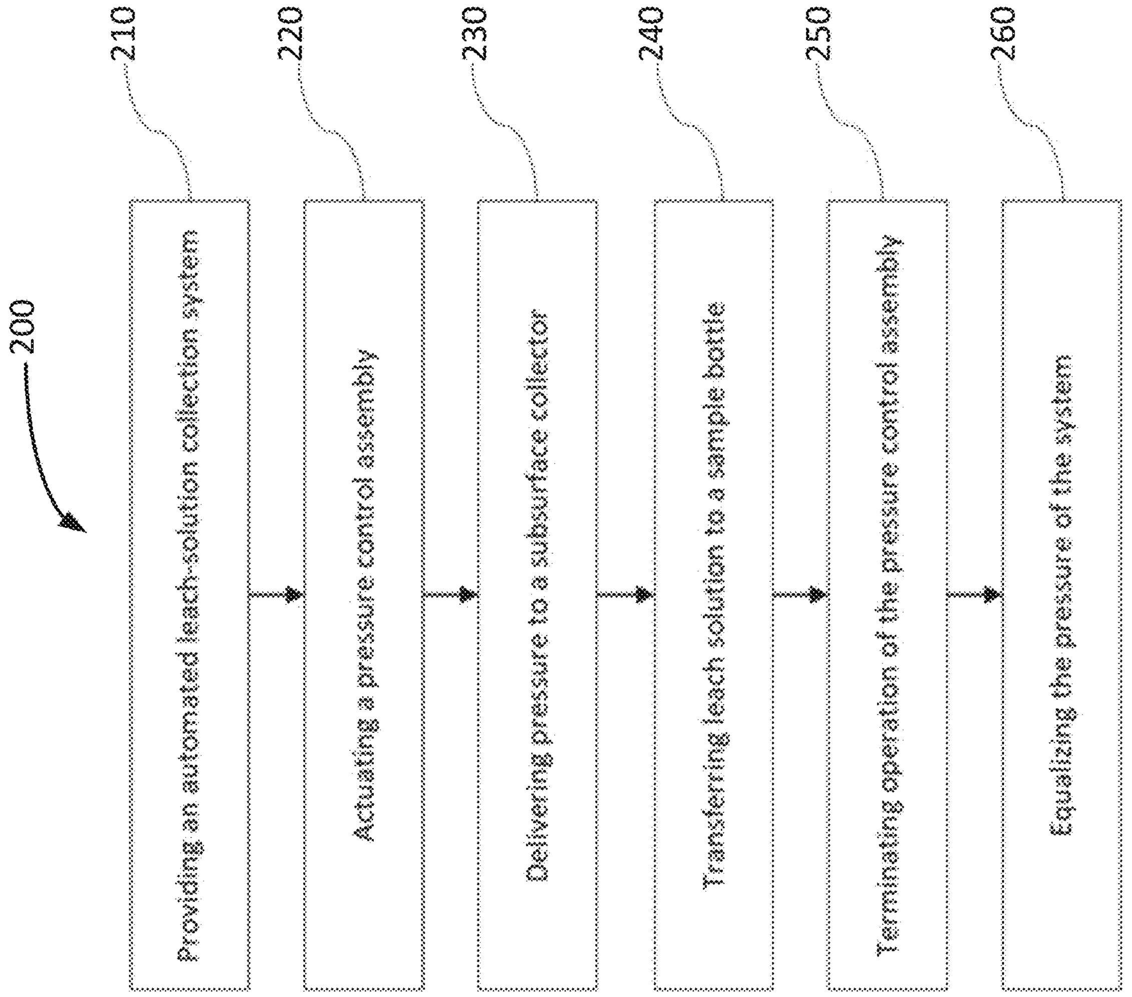
FIG. 2 illustrates a method for automated leach solution sampling, in accordance with various embodiments.

With reference now to FIG. 2, also disclosed herein is a method 200 for automatic leach solution collection, generally comprising: providing an automated leach solution collection system comprising an ore heap, an automated collection module, at least one leach solution collector disposed within the ore heap, and pressure and sampling lines fluidly coupling the module to the collector (step 210); actuating, via a controller, a pressure control assembly to generate an air pressure differential (step 220); delivering the air pressure differential through the pressure line to the leach solution collector (step 230); transferring leach solution through the leach solution sampling line into a sample collection vessel (step 240); terminating operation of the pressure control assembly after an interval (step 250); and equalizing pressure within the system (step 260).

In various embodiments, step 210 may comprise providing an automated leach solution collection system as described herein, such as the system 100. For example, the system may generally comprise an ore heap configured to receive a leach solution, at least one leach solution collector disposed within or beneath a surface of the heap, and an above-surface automated collection module fluidly coupled to the at least one collector by a pressure line and a leach solution sampling line. The automated collection module may house a pressure control assembly, a controller operatively coupled to the pressure control assembly, and at least one sample collection vessel. Each line may be connected to the module and the collector through sealed fittings capable of withstanding acidic or alkaline leach environments. In embodiments employing multiple collectors, each collector may be fluidly coupled to a dedicated pair of lines and an associated sample vessel such that individual locations within the heap can be sampled independently under control of the system.

In various embodiments, step 220 comprises actuating, via a controller, a pressure control assembly to generate an air pressure differential. The controller may actuate an air compressor, vacuum pump, or combination unit according to stored timing logic. In embodiments comprising a vacuum pump or combination unit, the pressure control assembly may draw negative pressure through the pressure line, whereas in alternative embodiments, the assembly may deliver compressed air through the pressure line. The controller may simultaneously open one or more valves along the selected pressure line to establish fluid communication between the pressure control assembly and a target leach solution collector. Actuation parameters, such as, for example, pressure magnitude and ramp time, may be programmed based on heap or solution characteristics.

In various embodiments, step 230 comprises delivering air pressure through the pressure line to the leach solution collector. In vacuum operation, the pressure control assembly may draw negative pressure through the line to create suction within the collector, drawing leach solution into the collector before subsequently delivering a positive pressure to transfer the collected solution through the sample line. In positive pressure operation, compressed air may flow through the pressure line to the collector, increasing internal pressure and forcing the contained leach solution outward through the sample line.

In various embodiments, step 240 may comprise transferring leach solution from the leach solution collector through the leach solution sampling line and into the sample collection vessel. When the desired pressure differential is applied, leach solution is conveyed through the sampling line, which may include a solenoid valve or flow restrictor to meter liquid transfer. The sample collection vessel may include an overflow tube to maintain atmospheric balance and to prevent an overflow of leach solution in the collection vessel.

In various embodiments, step 250 may comprise terminating operation of the pressure control assembly after completion of an interval, such as a sampling cycle. For example, the controller may deactivate the compressor or vacuum pump when a programmed timer expires. Any associated valves may subsequently close to isolate the sample collection vessel and prevent further fluid movement.

In various embodiments, step 260 may comprise equalizing pressure within the system to prepare for subsequent operation, such as by opening one or more purge valves to return the pressure within the system to atmospheric or ambient conditions, rendering the system amenable for further use in subsequent collection operations.

In certain embodiments, the method 200 may further comprise coordinating operation of multiple automated collection modules, each associated with at least one leach solution collector, to perform sampling across one or more ore heaps.

The present invention has been described with reference to various exemplary embodiments. However, many changes, combinations, and modifications may be made to the exemplary embodiments without departing from the scope of the present invention. For example, the various components may be implemented in alternate ways. These alternatives can be suitably selected depending upon the particular application or in consideration of any number of factors associated with the operation of the system. In addition, the techniques described herein may be extended or modified for use with other metal extraction processes. These and other changes or modifications are intended to be included within the scope of the present claims.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions, and methods may be made within the scope of the present invention, with substantially similar results. The subject matter of the inventions includes all novel and non-obvious combinations and sub combinations of the various elements, features, functions, and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims or the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. An automated leach solution collection system, comprising:

an ore heap configured to receive a leach solution;

a leach solution collector disposed within the ore heap;

an automated collection module, comprising:

a pressure control assembly;

a controller operatively coupled to the pressure control assembly; and a sample collection vessel;

a pressure line fluidly coupling the pressure control assembly to the leach solution collector; and a leach solution sampling line fluidly coupling the leach solution collector to the sample collection vessel;

wherein the controller is configured to actuate the pressure control assembly to generate an air pressure differential through the pressure line to induce transfer of the leach solution from the collector through the sampling line and into the sample collection vessel.

2. The system of claim 1, wherein the pressure control assembly comprises an air compressor and a vacuum pump.

3. The system of claim 2, further comprising a plurality of leach solution collectors disposed within the ore heap.

4. The system of claim 3, wherein each leach solution collector is fluidly coupled to the pressure control assembly by a corresponding pressure line, and to a corresponding sample collection vessel by a corresponding leach solution sampling line.

5. The system of claim 4, wherein each of the pressure lines and leach solution sampling lines includes at least one valve configured to control a flow of air or leach solution.

6. The system of claim 5, wherein the controller is configured to actuate the pressure control assembly and valves to control sample collection from the plurality of leach solution collectors concurrently.

7. The system of claim 5, wherein the controller is configured to actuate the pressure control assembly and valves to control sample collection from the plurality of leach solution collectors sequentially.

8. The system of claim 2, wherein the pressure control assembly is coupled to a pressure sensor or a pressure gauge.

9. The system of claim 1, wherein the ore heap comprises a run-of-mine heap or a crushed ore heap.

10. The system of claim 1, wherein the controller is configured to actuate the pressure control assembly according to a stored timing logic.

11. The system of claim 1, wherein the pressure line comprises a flexible polymer tube, composite tube, or rigid metal conduit.

12. The system of claim 1, wherein the leach solution sampling line comprises a flexible polymer tube, composite tube, or rigid metal conduit.

13. The system of claim 1, wherein the leach solution comprises a pregnant leach solution.

14. The system of claim 1, further comprising a power source.

15. The system of claim 14, wherein the power source comprises at least one of a battery and a solar panel.

16. The system of claim 1, wherein the controller is programmed to adjust at least one of a pressure magnitude or a sampling duration based on a location of the leach solution collector, heap permeability, or leach solution viscosity.

17. The system of claim 1, wherein the automated collection module comprises one or more fluid inlets and one or more fluid outlets configured to interface with the pressure line and the leach solution sampling line.

18. The system of claim 1, wherein the sample collection vessel comprises a volume from between about 100 mL to about 1000 mL.

19. The system of claim 18, wherein the sample collection vessel further comprises an overflow line.

20. The system of claim 1, wherein at least the pressure control assembly, the controller, and the sample collection vessel are housed within a main housing.

21. A method for automated leach solution collection, comprising:

providing an automated leach solution collection system, the system comprising:

an ore heap;

an automated collection module;

a leach solution collector disposed within the ore heap;

a pressure line fluidly coupling the automated collection module and the leach solution collector; and a leach solution sampling line fluidly coupling the automated collection module and the leach solution collector;

actuating, via a controller, a pressure control assembly of the automated collection module to generate an air pressure differential;

delivering the air pressure differential through the pressure line to the leach solution collector;

transferring leach solution from the collector through the leach solution sampling line and into a sample collection vessel;

terminating operation of the pressure control assembly; and equalizing pressure within the system.

22. The method of claim 21, wherein the pressure control assembly comprises an air compressor configured to deliver positive air pressure to displace leach solution from the collector into the sample collection vessel.

23. The method of claim 21, further comprising providing a plurality of leach solution collectors disposed within the ore heap, each fluidly coupled to the automated collection module by a corresponding pair of pressure and leach solution sampling lines.

24. The method of claim 23, wherein the controller is configured to actuate the pressure control assembly and a plurality of associated valves to control sample collection from the plurality of leach solution collectors.

25. The method of claim 21, wherein the controller is programmed to adjust at least one of a pressure magnitude or a sampling duration based on a location of the leach solution collector, heap permeability, or leach solution viscosity.

26. The system of claim 1, wherein the leach solution collector comprises a lysimeter.

* * * * *